Jan. 15, 1935.  H. C. HILL  1,988,119
INTERNAL COMBUSTION ENGINE
Filed Nov. 30, 1932  2 Sheets-Sheet 2

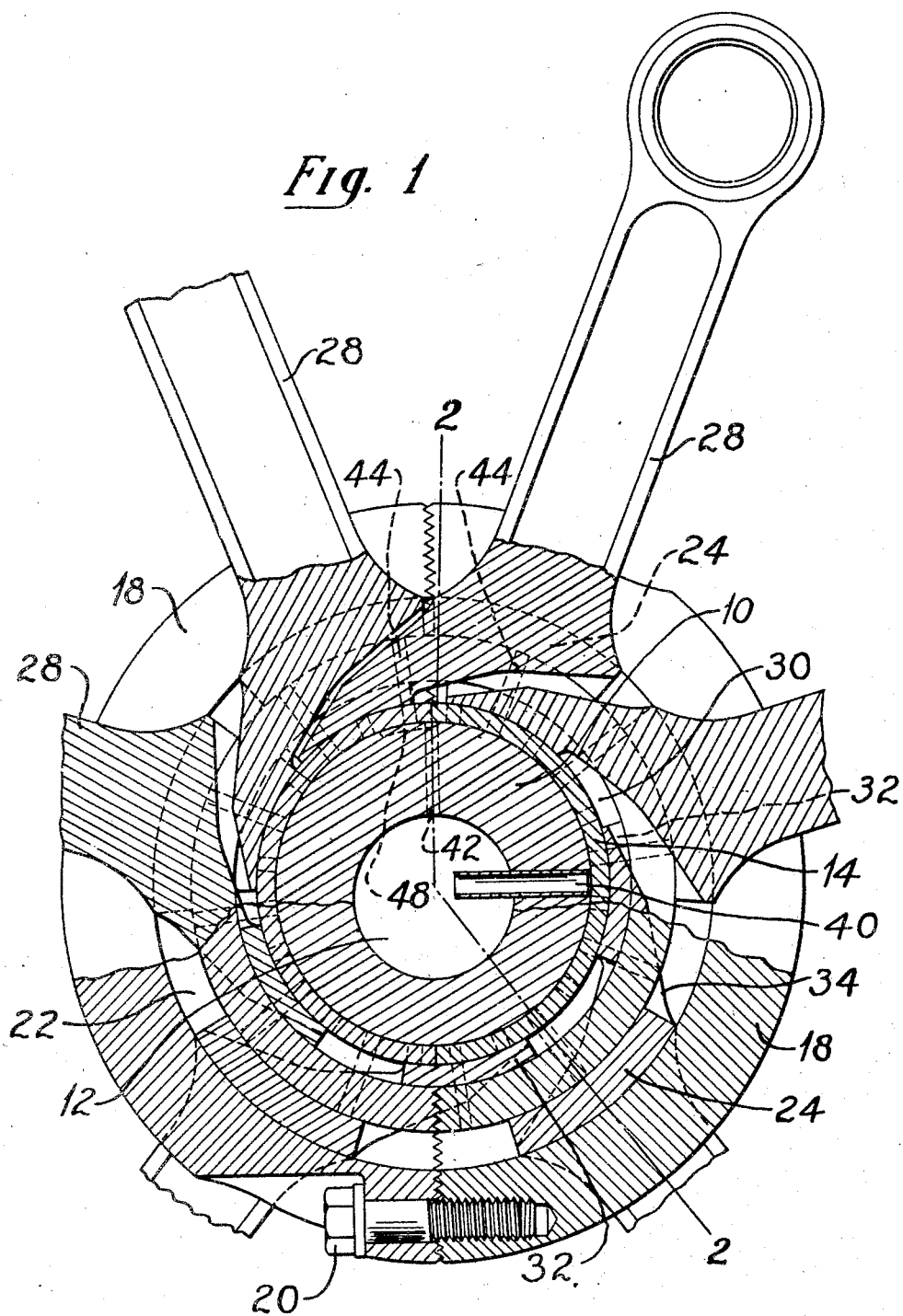

INVENTOR
HENRY C. HILL
BY
ATTORNEY

Patented Jan. 15, 1935

1,988,119

UNITED STATES PATENT OFFICE 1,988,119

INTERNAL COMBUSTION ENGINE

Henry C. Hill, Paterson, N. J., assignor to Wright Aeronautical Corporation, a corporation of New York Application November 30, 1932, Serial No. 645,001

8 Claims. (Cl. 74—580)

My invention relates to internal combustion engines, and more particularly to the construction and lubrication of connecting rods such as are used in aircraft engines of the radial cylinder type.

Ordinarily, in a radial cylinder engine, the pistons are connected to a common crankpin by a plurality of connecting rods. The conventional construction for such rods comprises a master rod bearing on the crankpin and provided with a plurality of spaced and offset knuckle pins on which are articulated the subsidiary or link rods. Due to the offset, the knuckle pin location causes the path of travel of each pin to be distorted into an elliptical shape whereby the thrust line becomes considerably offset from the center of the crankpin journal. Such distortion results in the following undesirable conditions:

(a) A heavy turning moment is applied to the master rod, resulting in high side pressures on the master rod piston by which the turning moment is resisted; and (b) The length of stroke and the accelerations of the various link rod pistons are distorted, resulting in errors in balance as well as errors in piston position with relation to the crankpin travel.

One object of the present invention is to overcome the disadvantages above noted. This is accomplished by providing in lieu of one or more master rods and a plurality of subsidiary or link rods, a connecting rod construction and assembly wherein all of the pistons have identical motions, and wherein no piston has greater side pressure loads than are usually encountered in a single cylinder engine.

A further object of the invention is to provide at the inner end of the connecting rods arcuate projections or "slippers", the slippers of each rod being preferably circumferentially and radially spaced, and the rods so constructed as to prevent at all times tilting and jamming of the slippers.

A further object of the invention is to provide for the connecting rods a connecting rod crankpin bearing member grooved to receive the circumferentially and radially spaced arcuate projections or slippers.

A still further object of the invention is to so construct said bearing as to provide for its, as well as for effective slipper lubrication.

Other and further objects of the invention are to provide a connecting rod construction which will be lighter and cheaper in fabrication than the conventional master and link rod assembly, and one wherein all of the rods are identical in size and form.

In the drawings, wherein like reference numerals denote like or corresponding parts, Fig. 1 is a transverse section on the line 1—1 of Fig. 2;

Figure 3:
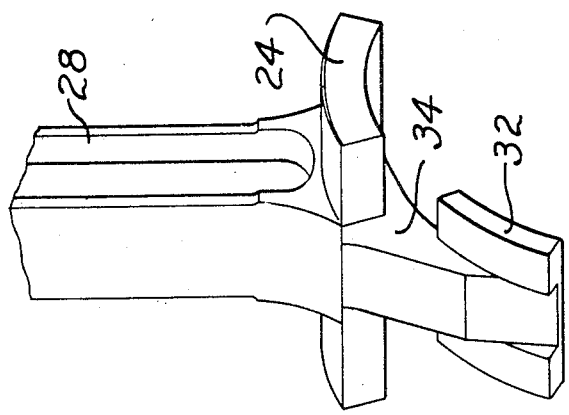
Fig. 3 is an isometric view of the crankpin end of one of the connecting rods.
Figure 2:
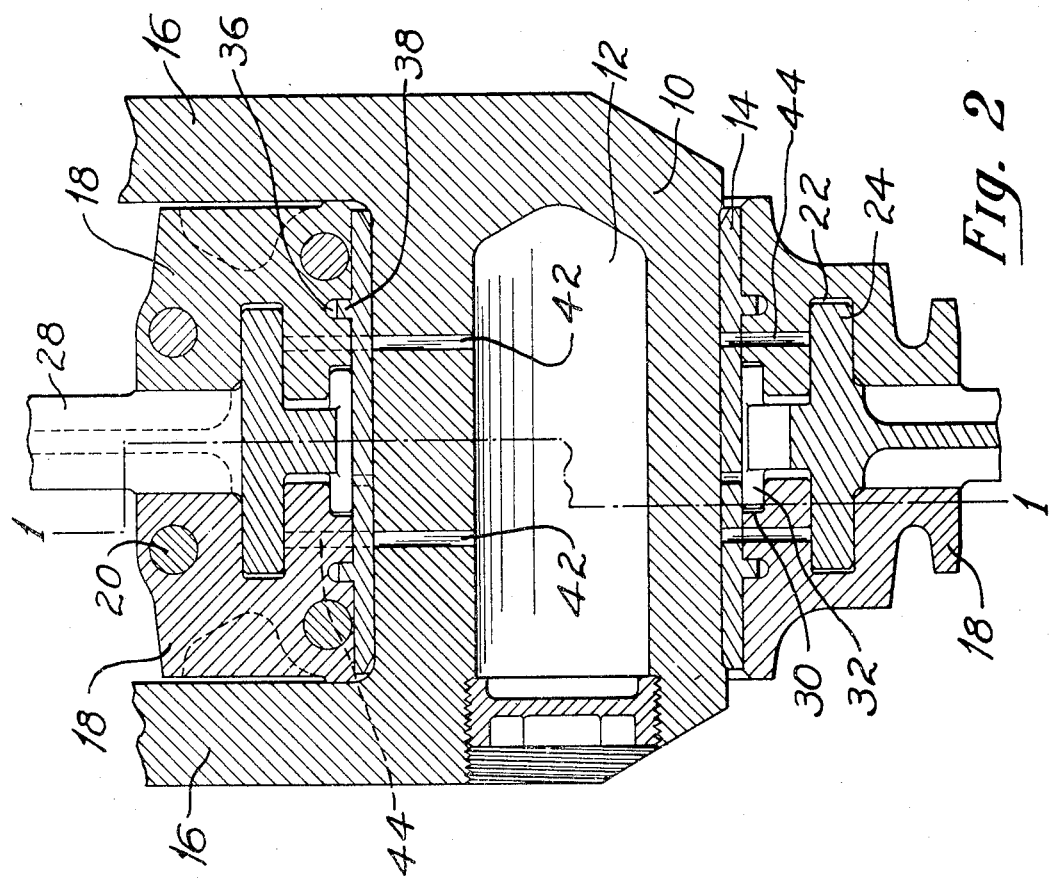
Fig. 2 is a section on the line 2—2 of Fig. 1.

In the embodiment of the invention selected for illustration, a crankpin 10, bored as at 12 for force feed lubrication, is shown. Engaging the crankpin is a bushing 14 comprising two halves. At the ends of the crankpin integral webs 16 are shown, but if either web be made detachable, a one-piece bushing instead of a bushing made in halves may be provided.

Clamped around the opposite ends of the two-piece bushing 14 are split or divided bearing members 18, the opposite halves of which are secured together by bolts 20. These bearing members are provided with grooves or tracks 22 in which are engaged the main slippers or projections 24 of the connecting rods 28. Each said groove or track extends completely around said bearing, and is so disposed in its relation to the other said groove as to bring the open sides of the grooves adjacent.

The bearing members 18 are further grooved as indicated at 30 and 36. The grooves or tracks 30 are spaced radially inwardly from the grooves 22 and are adapted to receive within their embrace auxiliary or guiding slippers 32 preferably formed integral with an arm 34 extending inwardly at an angle from each rod 28. Thus constructed, each rod 28 is given a relatively large overall arc of contact with the bearing members 18, whereby tilting of the rod is avoided, and each rod is "floated", as it were, at its inner end, so that creeping under the articulating action of the rods is made possible, and wear accordingly equally distributed all around both grooves or tracks 22-30. Collars or annular flanges 38 formed on the outer face of the bushing 14 engage in the grooves 36 and function to prevent lateral and tilting displacement of the bearing members 18 on the bushing.

The main oil feed to the crankpin bearing surface is by means of the separating tube 40 which projects through the crankpin wall. Further holes 42 are drilled through the crankpin to register with a plurality of holes 44 which communicate with the working faces of the grooves or tracks 22. In Fig. 1, the crank position is shown vertically downward, and it will be noted that the point of closest approach of adjacent slippers 24 is then between the upper pair of rods 28. For this reason, the holes 42, which register with the holes 44 as the crankshaft rotates, are located on the axis of the crank arm so that whichever of the holes 44 is in registry with the holes 42 passes the minimum open space between the slippers. A groove of a length equal to the spacing between adjacent holes 44 may be formed in the crankpin as indicated at 48, so that one of the holes 44 is at all times subject to oil pressure. The purpose of the specific location of the hole 42 just described, is to reduce to a minimum the amount of oil escaping through the spaces between adjacent slippers.

From the above, taken in connection with the accompanying drawings, it will be seen that the main slippers 24, being symmetrical with the shanks of the rods 28, take the entire explosion and inertia loads, and that the function of the extended or guiding slippers 32 is to stabilize the rods; and that, due to their offset location, these auxiliary or guiding slippers do not receive any reaction from the thrust or tension loads in the rods. While this particular arrangement comprises the preferred embodiment of slipper disposition, it will be obvious that by disposing the connecting rod shank intermediate the two slippers, the loads may be equally distributed therebetween, whereupon the term "main slippers" used in the description, will logically apply to the slippers in the outer groove.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A connecting rod system including a shaft carrying a member having two oppositely facing pairs of grooves concentric with each other and with the shaft axis; and a plurality of identical rods each including a pair of slippers engaging one said pair of grooves and having their centers coplanar with the rod axis and the shaft axis, and including a pair of slippers engaging the other said pair of grooves and having their centers aligned parallel to the shaft axis and circumferentially spaced from the rod axis.

2. A connecting rod system including a shaft carrying a member having two oppositely facing pairs of concentric grooves; and a plurality of identical rods each including a pair of slippers engaging one said pair of grooves, said slipper pairs having forward and rearward edges parallel to the shaft axis and being symmetrical with respect to the plane of the several rod axes, and each said rod including a pair of slippers engaging the other said pair of grooves, said last mentioned slipper pair also having forward and rearward edges parallel to the shaft axis and being symmetrical with respect to the plane of the several rod axes, and being circumferentially spaced from said first mentioned slipper pair.

3. In combination, in a connecting rod system for a radial cylinder engine, a crankpin bearing member having oppositely facing outer grooves and oppositely facing inner grooves, a rod having a pair of main slippers and a pair of auxiliary slippers extending on either side of the rod shank, the slippers of the main pair being symmetrically disposed on opposite sides of the rod midplane and the slippers of the auxiliary pair being symmetrically disposed on opposite sides of the rod midplane, and the pair of auxiliary slippers being circumferentially offset from the pair of main slippers, said pair of main slippers engaging one said pair of grooves, and said pair of auxiliary slippers engaging the other said pair of grooves.

4. In a connecting rod system for a radial cylinder engine, in combination, a crankpin member having inner and outer grooves comprising opposed pairs, a rod having pairs of slippers engaged in said grooves, one pair of slippers being offset circumferentially with respect to the other, and the slippers of each pair being symmetrically disposed relative to the plane of movement of the rod.

5. In a connecting rod system for a radial cylinder engine, a crankpin member having inner and outer grooves comprising opposed pairs, a rod having pairs of slippers engaged in said grooves, each pair of slippers being spaced apart circumferentially and radially from the other said pair, and the slippers of each pair having an equal arc of embracement and being symmetrical relative to the plane of rod movement, whereby axial load on said rod produces no rotational component about the axis thereof.

6. Means for articulating a plurality of connecting rods to a master crankpin bearing, said bearing having inner and outer opposed tracks formed therein, including main and auxiliary slippers carried by each said rod engaged in the respective tracks, said slippers being disposed in looking glass symmetry on either side of the center plane of movement of the rods, whereby rotational reaction about the axis of the rods is avoided, the auxiliary slippers being circumferentially spaced from the main slippers to afford a wide arc of total embracement against jamming of the slippers in the tracks.

7. The combination with a master crankpin bearing having opposed grooves, of a plurality of rods each having main and auxiliary slippers in similar circumferential disposition on either side of the mid-plane of the rod, said auxiliary slippers being spaced circumferentially from said main slippers and said main and auxiliary slippers engaging within said grooves.

8. The combination with a master crankpin bearing having opposed sets of radially spaced grooves, of a plurality of rods each having main and auxiliary slippers disposed respectively in looking glass symmetry on either side of the midplane of the rod, the auxiliary slippers being circumferentially and radially spaced from the main slippers, the auxiliary slippers engaging one set of grooves and the main slippers engaging another said set of grooves.

HENRY C. HILL.